United States Patent [19]

St. Clair

[11] 4,061,257
[45] Dec. 6, 1977

[54] CAR RACK FOR GOLF CARTS

[76] Inventor: Paul J. St. Clair, 737 Magnolia Ave., San Bruno, Calif. 94066

[21] Appl. No.: 706,053

[22] Filed: July 16, 1976

[51] Int. Cl.$^2$ .............................................. B60R 11/00
[52] U.S. Cl. .............................. 224/42.08; 211/60 G; 224/29 R
[58] Field of Search ................. 224/42.03 R, 42.03 A, 224/42.03 B, 42.06, 42.07, 42.08, 42.43, 42.44, 29 R, 42.1 R, 42.1 E; 211/60 G, 60 SK, 64

[56] References Cited

U.S. PATENT DOCUMENTS

| | | | |
|---|---|---|---|
| 2,220,292 | 11/1940 | Schmidt | 224/42.03 R |
| 2,338,955 | 1/1944 | Metcalf | 224/42.03 X |
| 2,499,103 | 2/1950 | Love | 224/42.43 |
| 3,765,581 | 10/1973 | Kosecoff | 224/42.03 B |

Primary Examiner—Lawrence J. Oresky
Assistant Examiner—Winston H. Douglas

Attorney, Agent, or Firm—Owen, Wickersham & Erickson

[57] ABSTRACT

A golf bag and golf cart carrier for automobiles is disclosed. The carrier is composed of two major parts: a frame attached to the rear bumper of the automobile, and a carrier rack that is removably pivoted to the bumper-attached frame and rotatable about a horizontal axis parallel to and above the bumper. The axis is positioned on the carrier rack so as to be below the center of gravity of the rack and its load. The height of the axis above the bumper is such that the carrier rack may be rotated forward to rest its upper end on the vehicle rear deck when loaded. This enables the weight of the carrier rack and its load to be distributed between the rear bumper and the rear deck, e.g., the trunk of the vehicle. Pads connected near the upper end of the carrier rack engage the rear deck, and collapsible braces or struts at the lower end of the carrier rack hold that end away from the bumper-attached frame to tightly secure the pads against the rear deck and hold the carrier rack securely in the rotated transporting position.

15 Claims, 6 Drawing Figures

CAR RACK FOR GOLF CARTS

BACKGROUND OF THE INVENTION

The invention relates to vehicle-attached carrying devices, and to a device particularly adapted for transporting golf bags and attached carts on the rear of an automobile.

A number of carrying devices for transporting various items such as bicycles and skis on the rear of an automobile have been proposed. See, for example, U.S. Pat. Nos. 3,765,581 and 3,847,317. Some of the carriers have been collapsible or removable to varying degrees from the vehicle. Most have depended exclusively or primarily on the rear bumper for support and stability of the load. The device of the above mentioned U.S. Pat. No. 3,847,317 did derive some support from the trunk lid of the car on which it was to be attached.

There has been a need for a carrying device capable of supporting relatively heavy loads on the rear exterior of an automobile without cumbersome, heavy or bulky components, without interfering with the raising of the vehicle rear deck, whether it be a trunk or a hood, and with the ability to remove the majority of the device easily so that when the carrier is not in use, only a small unobtrusive portion remains attached to the exterior of the vehicle. This is particularly true in the case of golf bags and attached carts which normally have foldable wheel struts and pull handles. The bag and cart combination is often quite heavy and is also bulky. Thus, many car trunks will not receive even a single bag and cart inside, and even larger car trunks generally will not hold three or four bags and carts. Besides, the lifting of a heavy bag and cart and its placement in a car trunk require bending of the back and can cause back ache and injury. An exterior device for supporting such a heavy load should also be lightweight enough that it can be easily installed and removed and so that it does not add appreciably to the total load, while at the same time being sturdy enough that one, two or more golf bags or carts can be transported securely and stably.

SUMMARY OF THE INVENTION

The present invention provides a vehicle-attached carrier which meets the above requirements and advantageously transports heavy and bulky generally elongated loads such as golf bags and attached carts with efficiency and dependability. The device includes a small bumper-attached frame with arms extending above the bumper to a pivotal connection with a golf club bag and cart carrier rack which may be rotated from an initial upright position to a forward obliquely angled position for travelling. The carrier rack is readily detached from the bumper frame by removal of a pivot shaft, and the bumper frame itself may be removed from the vehicle's rear bumper with little difficulty. However, the bumper frame is small and unobtrusive and may be left connected to the bumper when the carrier device is not needed.

The carrier rack is a frame of lightweight materials, with its horizontal pivot axis positioned below the center of gravity of the rack and attached load. The carrier rack is removably connected to the bumper-attached frame along its axis at a selected distance above the bumper. This distance is adjustable and depends upon the shape of the vehicle's rear end. With the carrier rack in an initial upright position, the load, such as golf bags and attached carts, is placed on a bottom platform of the rack in an upright position and strapped in with several retaining straps which extend around the rear side of the load. The rear deck of the vehicle, which is usually a trunk lid, may be raised or lowered with the carrier rack in this position.

For transporting of the load the carrier rack is rotated about the horizontal axis to a position wherein its top is forward and is supported against the trunk lid by a pair of support legs having non-scratching resilient pads on their ends. In this rotated position the center of gravity of the rack and load is preferably forward of the pivot axis, so that a portion of the load and rack weight is supported by the trunk lid. To brace the rack in this position against the trunk lid for travelling, at least one collapsible brace is provided at the lower end of the carrier rack, connected also to the bumper-attached frame. When extended into locking position, this brace or strut holds the lower end of the carrier rack spaced from the bumper frame so that the pads at the upper end of the carrier rack are held securely against the rear deck of the vehicle. Thus, the weight of the load and rack is distributed between the bumper and the rear deck, and with the rack firmly so held at multiple points on the vehicle, the rack and load are highly stable when the vehicle is in motion. Another advantage of the tilted configuration of the carrying device is that inertia of rest and motion are better resisted. The initially relatively high center of gravity of the rack and load is lowered by the tilting and moved closer to the level of the pivot axis which is just above the bumper and which is rigidly fixed with respect to the bumper. Thus, fore and aft inertia forces have only a short lever arm about which to push against the bumper, and they are further resisted by the contact of the carrier rack with the trunk lid.

The structure of the present carrier device provides for wide application to varying vehicle rear end designs. The bumper frame connecting means is adapted to accommodate a wide range of bumper heights and depths. The height of the pivot axis above the bumper, as well as its position along the carrier rack, is adjustable to accommodate various rear deck shapes and heights. To further control the angle of repose of the carrier rack and to adjust it for tight engagement against the trunk lid, the deck-engaging legs are adjustable in length and in position on the rack and the collapsible strut at the lower end is also adjustable in position between the rack and the bumper frame so as to affect the rack tilt in its extended position. The pressure with which the carrier rack leg pads bear against the trunk lid is therefore finely adjustable.

The carrier rack may be easily removed from the bumper-attached frame for removing a load from the vehicle or for removing the rack for periods of non-use. A horizontal pivot shaft extends through eye holes on the carrier rack and on the bumper frame, the shaft being retained in place by a head on one end and a removable cap on the other. To remove the carrier rack, the collapsible brace or braces are first disconnected from the bumper frame by a readily detachable fastener, then the cap is removed from the pivot shaft so that the shaft can be pulled out and the rack is free of the bumper frame. The shaft may then be retained on either the bumper frame or the carrier rack until the rack is to be reconnected.

Another advantage of the pivoted carrier of the invention is that on many cars, rear window vision is substantially unimpaired when the rack is rotated forward with its load. The rotation also permits view of the rear license plate on most cars. Tail light visibility is completely unobstructed.

It is therefore among the objects of the invention to provide a relatively simple carrying device for the rear of a vehicle, wherein the load is quickly and easily mounted on the carrier, the weight is distributed between the bumper and the rear deck of the vehicle during movement for high stability and efficiency of structure, the rear deck of the vehicle may be raised without disconnecting the carrier or the load, and wherein the carrier may be applied to a number of different types of vehicle rear ends.

Other objects, advantages and features of the invention will be apparent from the following description taken in conjunction with the accompanying drawings.

DESCRIPTION OF THE PREFERRED EMBODIMENT

Figure 2:
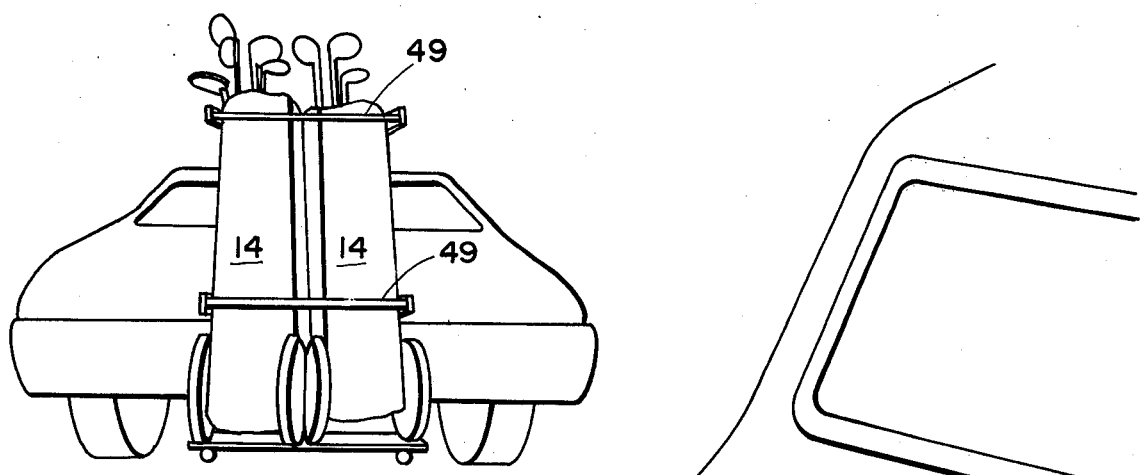
FIG. 2 is a rear perspective view of an automobile with the carrier device carrying two golf bags and attached carts, the carrier rack of the device being in an upright position.
Figure 1:
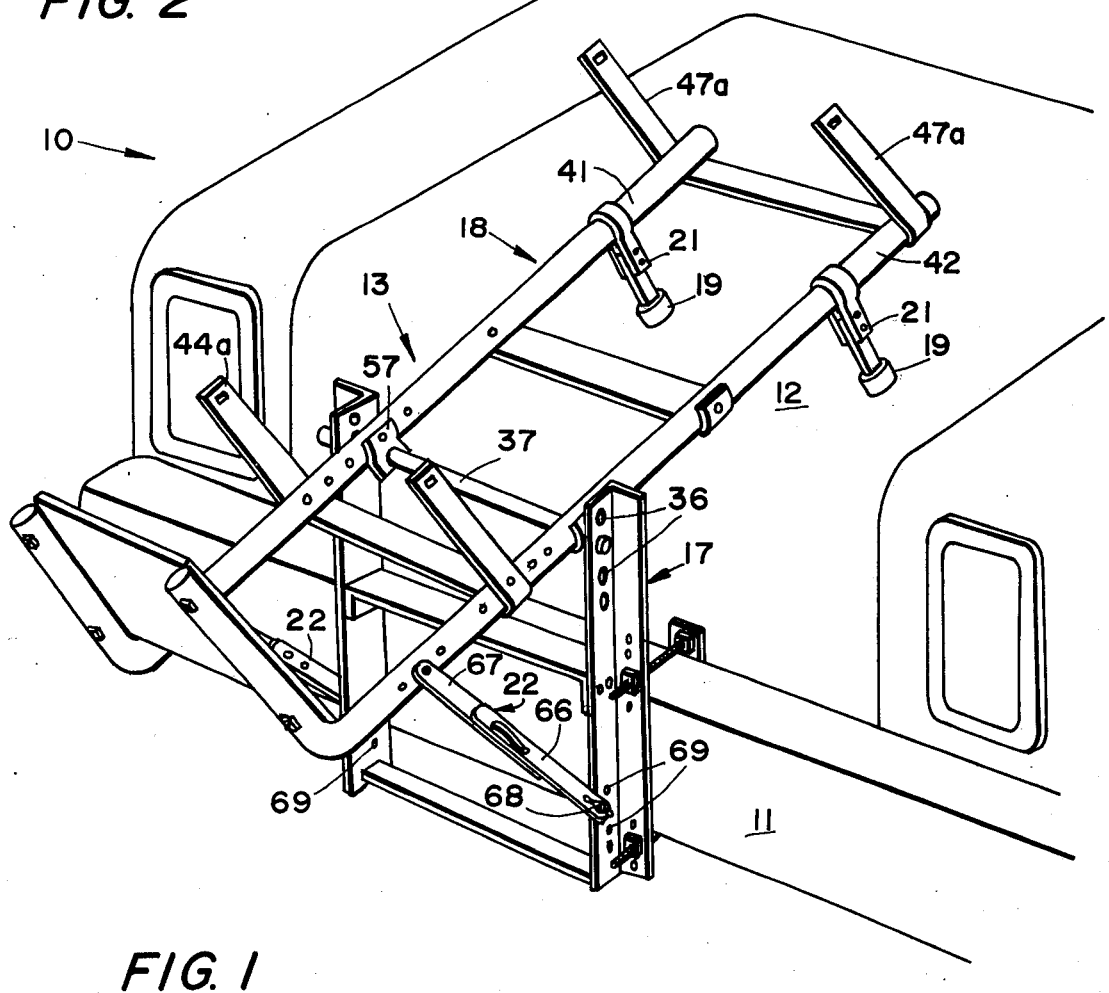
FIG. 1 is a perspective view of an automobile rear end supporting a carrier device according to the invention.

In the drawings, FIG. 1 shows the rear end of an automobile 10, including a rear bumper 11 and a rear deck or trunk lid 12. Secured to the bumper 11 and engaged against the rear deck 12 is a carrier device 13, to which may be secured a pair of golf bags and attached carts 14, as shown in FIG. 2. The device 13 comprises a bumper-attached frame generally indicated at 17, and a carrier rack generally indicated at 18, removably pivoted to the bumper frame 17. As discussed above, the carrier rack 18 is pivoted forward to the transporting position with resilient pads 19 of short bearing legs 21 pressing against the deck 12. This firm engagement is maintained by a pair of collapsible braces or struts 22 in bracing engagement between the lower end of the carrier rack 18 and the lower end of the bumper frame 17.

Figure 3:
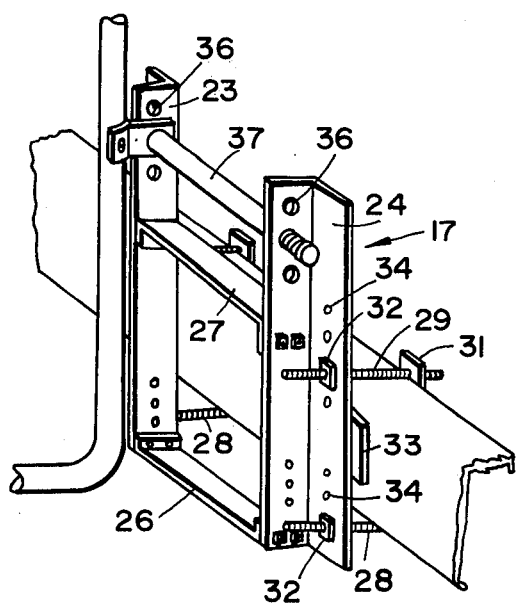
FIG. 3 is a perspective view of a bumper-attached frame of the carrier, with a portion of the removable carrier rack indicated.

As shown in FIG. 3, the bumper-attached frame 17 may comprise a pair of vertically oriented, spaced angle members 23 and 24, with spacing braces 26 and 27 extending between them. To connect the bumper frame 17 to the vehicle bumper, any suitable type bumper gripping assembly may be used. For example, the assembly may comprise lower and upper threaded rods 28 and 29 on each frame upright 23 and 24, with a bumper edge clip 31 on each for engaging the upper and lower bumper edges. A nut 32 at the rear of each rod 28 and 29, in threaded engagement with the rod, may be rotated to draw the clips 31 toward the bumper frame and thereby to engage the bumper between the clips and the uprights 23 and 24. A spacer pad 33 may be provided on each upright between the upper and lower rods 28 and 29 for engaging the rear face of the bumper 11. For accommodating a variety of shapes and sizes of bumpers, the rods 28 and 29 may be selected of various lengths, and bores 34 in the uprights 23 and 24 may be provided at multiple spaced positions for receiving the rods 28 and 29.

Several other types of bumper connections may be used in lieu of the illustrated apparatus. For example, the connecting device shown in U.S. Pat. No. 3,847,317 may be employed on the carrier 13.

At the upper side of the bumper-attached frame 17, the uprights 23 and 24 extend a short distance above the vehicle bumper and include a plurality of corresponding pairs of bores 36 for a pivot shaft 37 which is inserted therethrough to rotatably support the carrier rack 18 on the bumper frame 17. As previously discussed, the pivot shaft bores 36 are at plural levels so that the height of the carrier rack 18 can be properly selected for the particular vehicle on which the device 13 is used.

Figure 4:
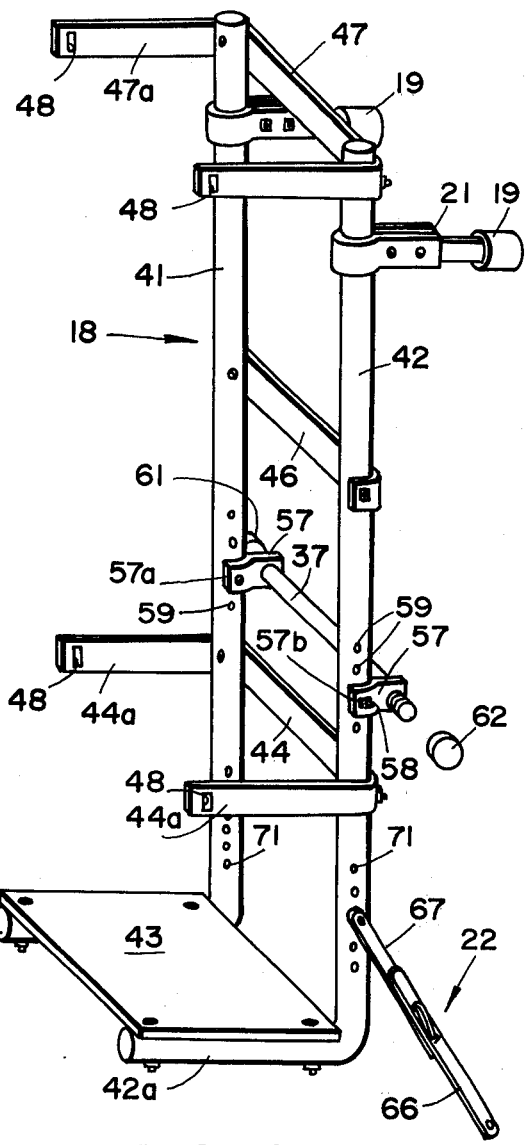
FIG. 4 is a perspective view showing the carrier rack, detached from the bumper-attached frame.

As shown in FIG. 4, the carrier rack 18 is a frame which preferably comprises a pair of left and right tubular members 41 and 42, each being bent through approximately 90° at its bottom to form rearwardly projecting arms 41a and 42a. These arms support a plate 43 which in turn supports the load when it is mounted on the carrier rack 18, as shown with the golf bags and carts 14 in FIG. 2. The plate 43, affixed to the arms 41a and 42a of the tubular members 41 and 42 by suitable fasteners, maintain the spacing and structural integrity of the carrier rack frame 18 at the bottom, while additional spacers 44, 46 and 47 extend between the members 41 and 42 at upper locations, as shown. At the location of several of the spacers may be included rearwardly extending arms, such as those 44a and 47a shown, and these may be integral with the spacers at those locations. The arms 44a and 47a act as load retaining side rails and include holes 48 for attachment of load retaining straps 49 (see FIG. 2).

Figure 5:
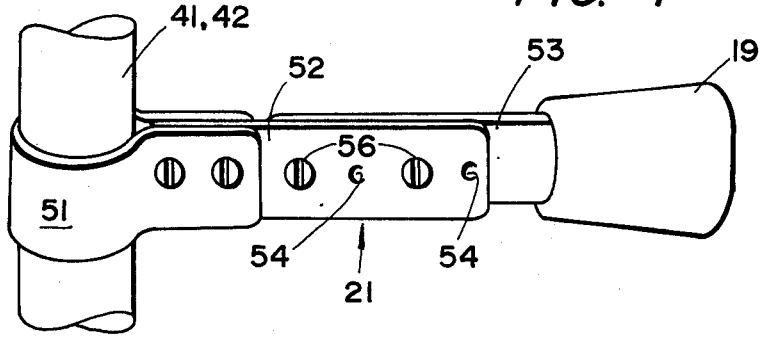
FIG. 5 is a perspective detail view of a bracing leg of the carrier rack.

The bearing legs 21 and their end pads 19 are shown in greater detail in FIG. 5. As indicated, each leg includes a clamp roller 51 for engaging the tubular member 41 or 42 of the carrier rack 18. These clamp collars are movable to any desired position on the tubular members for engagement at the desired location on the vehicle rear deck. The legs 21 also include extension members 52 and 53 connected to the clamp collar 51, the end of the extension member 53 being seated in the resilient deck-engaging pad 19. The clamp collar 51 is bolted to the first extension member 52, and both extension members preferably include a plurality of holes 54 for receiving a pair of fasteners 56 at various degrees of leg extensions. The legs 21 are therefore adjustable in length as well as in position, further to facilitate their proper adjustment for the vehicle on which the carrying apparatus is installed. Of course, any other type leg of adjustable length can be used, as long as it can be firmly locked to the selected length. For example, a telescoping leg (not shown) might be substituted for the leg 21.

As shown in FIGS. 1 and 4, the carrier rack 18 receives the pivot shaft 37 preferably by means of brackets 57 which are connected to the tubular members 41 and 42, and which are bored for receipt of the shaft 37. Each bracket has a pair of flanges 57a and 57b for engaging both sides of each tubular member 41 and 42. The brackets are retained to the tubular members by bolts 58, for which there are provided a plurality of sets of holes 59 so that the brackets and the axis of rotation of the carrier rack 18 may be shifted with respect to the length of the carrier rack as discussed above.

The pivot shaft 37 itself may consist of an elongated rod having a head 61 at one end and a removable cap 62 at the other. The cap 62 may be secured to the end of the rod by any suitable device which is secure but easily disengaged. For example, a spring pin connection may be used (not shown).

Figure 6:
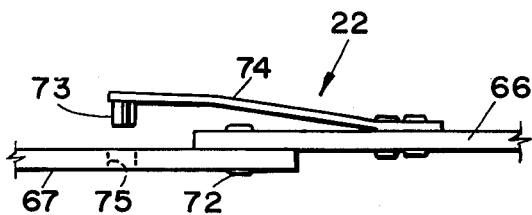
FIG. 6 is a detail view of a collapsible strut shown in the assembled view of FIG. 1.

The collapsible struts 22 are shown in FIGS. 1, 4 and 6. They are preferably provided on each side of the carrier rack 18, each strut having first and second arms 66 and 67 pivotally connected to the lower end of the bumper frame upright 23 or 24 and the lower end of the tubular member 41 or 42, respectively. The leg 66 is pivoted to the bumper frame upright by a bolt connection, preferably with a wing nut 68 provided for easy removal when the carrier rack 18 is to be removed from the bumper frame 17. A plurality of vertically spaced holes 69 are provided in each upright so that the position of the leg 66 can be adjusted to control the maximum tilt of the carrier rack 18. The second leg 67 of each collapsible strut 22 is preferably bolted to the tubular member 41 or 42 through one of a plurality of spaced holes 71. This further provides for adjustment of the carrier rack tilt. The two legs 66 and 67 are pivoted together at their other ends by a bolt or rivet connection 72 (see FIG. 6), and they may be locked in the extended position by a pin and spring device shown in FIG. 6. A pin 73 is connected by a spring 74 to one of the legs and is biased toward an aligned hole 75 in the other leg. Thus, when the two legs are in the extended position, the pin 73 may be engaged in the hole 75 to firmly lock the strut 22 in its extended position, and the pin may be easily disengaged when it is desired to fold the collapsible strut 22 and move the carrier rack 18 into its upright position. Struts 22 are preferably provided on both sides of the rack 18, and both may include the locking pin device.

When the carrying apparatus 13 of the invention is to be used for transporting, for example, two sets of golf clubs with bags and carts, the carrier rack 18 is first connected onto the bumper-attached frame 17. This is done by lifting the rack to align its shaft brackets 57 with the proper bumper frame shaft holes 36 and inserting the pivot shaft 37 through the aligned openings. The shaft brackets 57 will, of course, be properly positioned on the tubular members 41 and 42 so that the center of gravity of the load and the carrier rack is the desired distance above the pivot axis defined by the shaft 37. With the shaft in place, the cap 62 is placed on its end so that it cannot slide out. The collapsible struts 22, which normally remain with the carrier rack 18, are then connected to the bumper frame at the proper location for later bracing of the deck pads 19 against the trunk lid. Then, with the struts 22 collapsed and the carrier rack 18 in its upright position, the bags and carts are lifted onto the support plate 43 of the rack and are bound in by the straps 49 extended from the arms 44a and 47a (see FIG. 2). When the automobile is prepared to depart and the trunk or deck lid need not be further opened, the carrier rack 18 is rotated forward to its inclined position wherein the pads 19 of the bearing legs 21 are rested upon the trunk lid. Finally, the collapsible struts 22 are rotated to their extended positions, forcing the pads 19 more tightly against the deck as shown in FIG. 1, and locked into the extended position by engagement of the locking pin 73 in the hole 75. The carrier rack 18 and its attached load are now very stably retained on the vehicle, by virtue of the rack's firm connection in three areas: at the rear deck; at the pivot axis; and at the struts 22. This helps resist forces in all directions, and the position of the center of gravity of the load further aids in stability by helping resist inertial forces as discussed above.

The above described preferred embodiment provides a vehicle-attached carrying device which is relatively simple in construction and universal in application, but which is highly efficient in that it allows a load to be carried on the rear of a vehicle with great stability without heavy or high-strength structural members. All or part of the device can easily be removed from the vehicle, and the vehicle's rear deck can be opened and closed without removing the device or the load. Various other embodiments and alterations, to this preferred embodiment will be apparent to those skilled in the art and may be made without departing from the spirit and scope of the following claims.

I claim:

1. An apparatus for carrying golf bags and attached carts on the rear of a vehicle, comprising:
    a bumper frame oriented generally vertically, having a pair of spaced side arms extending upwardly;
    means affixing the bumper frame to the rear bumper of the vehicle;
    a lightweight elongated carrier rack having means for securely retaining at least one golf bag and attached cart to itself;
    means pivotally connecting the carrier rack to the side arms of the bumper frame for rotation about a horizontal axis generally parallel to the rear bumper and located below the center of gravity of the rack and attached golf clubs and carts;
    pad means mounted on the forward side of the carrier rack toward its upper end for resting upon the vehicle's rear deck when the rack is pivoted forward; and
    collapsible, quick-release compression brace means connected to the lower end of the carrier rack and to the lower part of the bumper frame, below said horizontal axis, for exerting an upward pushing force on the lower end of the rack so that the rack is tightly urged in the forward rotated direction to a forward position with the pad means tightly engaged against the vehicle rear deck, said compression brace means having a collapsed, relaxed position when said rack is in an upright position and an extended, locked compression position when said rack is in the forward position;
    whereby the vehicle's rear deck may be raised and lowered with the carrier rack in the upright position, the golf clubs and carts may be easily loaded onto the carrier rack, and the loaded rack may be rotated to the forward position and locked to distribute weight between the bumper frame and the vehicle rear deck.

2. The apparatus of claim 1 wherein the carrier rack comprises left and right spaced elongated members extending through the length of the rack with a rearwardly extending platform affixed to the bottoms of the spaced members for supporting the golf bags and carts, spacers connecting the two spaced members at positions above the platform, and means associated with each of the spaced members above the platform, for receiving at least one strap to extend across and retain the golf bags and carts to the carrier rack.

3. The apparatus of claim 2 wherein the pivotally connecting means comprises a pivot bracket on each spaced elongated member of the carrier rack, said brackets having aligned bores on said horizontal axis, a corresponding pair of aligned bores in the arms of the bumper frame, and a removable pivot shaft passing through the aligned bores.

4. The apparatus of claim 3 wherein the pivot brackets are mountable at a plurality of positions on the spaced elongated members to provide for adjustment of the position of said horizontal axis with respect to the length of the carrier rack, whereby the position of the center of gravity of the golf bags and carts can be controlled.

5. The apparatus of claim 3 wherein each bumper frame arm has a plurality of aligned bores at vertically spaced intervals, through any corresponding pair of which the pivot shaft may be passed to provide the adjustment of the height of said horizontal axis.

6. The apparatus of claim 1 wherein said collapsible brace means comprises a first brace leg pivoted at one end to the carrier rack, a second brace leg pivoted at one end to the bumper frame, both brace legs lying generally in a vertical plane perpendicular to said horizontal axis and being pivoted together at their other ends, and locking means for engaging the two brace legs to prevent their rotation and collapse when they are extended into linear relationship.

7. The apparatus of claim 6 wherein the locking means comprises an opening near said other end of one of the brace legs, and a pin connected to the other brace leg, engageable in the opening when the brace legs are in extended linear position and biased toward the opening.

8. The apparatus of claim 6 wherein the carrier rack includes means for pivotally receiving the first brace leg at a plurality of spaced positions, whereby the degree to which the rack is pivoted in the extended position of the brace legs is adjustable.

9. The apparatus of claim 6 wherein the bumper frame includes means for pivotally receiving the second brace leg at a plurality of vertically spaced positions, whereby the degree to which the carrier rack is pivoted in the extended position of the brace legs is adjustable.

10. The apparatus of claim 6 wherein the second brace leg is pivoted to the bumper frame by readily removable connection means, whereby the brace legs may be removed along with the carrier rack when the pivot shaft is removed.

11. The apparatus of claim 1 wherein the position of the pad means along the length of the carrier rack is adjustable to accommodate various vehicle rear deck shapes.

12. The apparatus of claim 1 wherein the distance to which the pad means extends forward from the carrier rack is adjustable.

13. An apparatus for transporting an elongated load on the rear of a vehicle, comprising:
   a rear bumper-attached frame assembly oriented generally vertically;
   a lightweight elongated carrier rack including load retaining means, said rack being connected to the bumper-attached assembly by pivot means on a horizontal axis generally parallel to and above the bumper, said axis being below the center of gravity of the carrier rack and the attached load when the carrier rack is upright, said pivot means including aligned apertures on the rack and on the upper part of the bumper frame, with slidable, removable shaft means extending through the apertures, so that the rack may be disconnected from the bumper frame;
   means extending from the forward side of the carrier rack, near its upper end, for engaging the rear deck of the vehicle when the carrier rack is rotated to a forward position; and
   collapsible, quick-release compression brace means connected to the lower end of the carrier rack and to the lower part of the bumper-attached assembly, below said horizontal axis, for exerting an upward pushing force on the lower end of the rack so that the rack is tightly urged in the forward rotated direction to a forward position with the engaging means tight against the rear deck of the vehicle, with means for holding the brace means in a bracing position wherein said brace means exerts said upward pushing force and with means facilitating removal of the brace means from the bumper-attached assembly;
   whereby rear deck of the vehicle may be raised and lowered with the carrier rack in an upright position, the load may be easily mounted on the carrier rack in the upright position, the loaded carrier rack may be rotated to the forward position and locked to distribute weight between the bumper-attached assembly and the rear deck of the vehicle, and the carrier rack may be easily removed from the vehicle, with the bumper-attached assembly remaining on the vehicle, for periods of nonuse of the rack.

14. The apparatus of claim 1 wherein said means pivotally connecting the carrier rack to the side arms of the bumper frame includes means facilitating easy removal of the rack from the bumper frame at the pivot connection, including aligned apertures on the rack and on said side arms, with slidable, removable shaft means extending through the apertures, and wherein said collapsible brace means also includes means facilitating its easy removal from the bumper frame, whereby the entire carrier rack may be easily removed from the vehicle, with the bumper frame left attached, for periods of nonuse of the rack.

15. A fully adjustable apparatus for carrying golf bags and attached carts on the rear of a vehicle, comprising:
   a bumper frame oriented generally vertically, having a pair of spaced side arms extending upwardly;
   means affixing the bumper frame to the rear bumper of the vehicle;
   a lightweight elongated carrier rack having means for securely retaining at least one golf bag and attached cart to itself in a generally upright orientation;
   removable shaft means pivotally connecting the carrier rack to the side arms of the bumper frame for rotation about a horizontal axis generally parallel to the rear bumper and located below the center of gravity of the rack and attached golf clubs and carts, said side arms and said rack having alignable apertures for slidable receipt of the shaft means;
   means associated with said shaft means for adjusting the position of said horizontal axis with respect to the length of the carrier rack, so that the position of said center of gravity can be controlled;
   pad means mounted on the forward side of the carrier rack toward its upper end for resting upon the vehicle's rear deck when the rack is pivoted forward, said pad means being adjustable in the distance to which it extends forward from the carrier rack, to accommodate different rear deck shapes; and collapsible, quick-release compression brace means connected to the lower end of the carrier rack and to the lower part of the bumper frame, below said horizontal axis, for exerting an upward pushing force on the lower end of the rack so that the rack is tightly urged in the forward rotated direction to a forward position with the pad means tightly engaged against the vehicle rear deck, said compression brace means having a collapsed, relaxed position when said rack is in an upright position and an extended, locked compression position with said rack is in the downward position, with means facilitating easy removal of the brace means from the bumper frame and means for adjusting the position of the brace means between the bumper frame and the carrier rack so as to provide adjustability in the degree to which the rack is pivoted in the extended position of the brace means;

whereby the vehicle's rear deck may be raised and lowered with the carrier rack in the upright position, the golf clubs and carts may be easily loaded onto the carrier rack, the loaded rack may be rotated to the forward position and locked to distribute weight between the bumper frame and the vehicle rear deck, and the carrier rack may be removed without removal of the bumper frame, for periods of nonuse.

* * * * *